United States Patent
Yu et al.

(10) Patent No.: US 9,494,457 B2
(45) Date of Patent: Nov. 15, 2016

(54) TANK LIQUID DEPTH MEASUREMENT METHOD USING A PRESSURE SENSOR

(71) Applicant: CUB ELECPARTS INC., Fuxing Township, Changhua County (TW)

(72) Inventors: Yu-Tao Yu, Fuxing Township, Changhua County (TW); Ming-Hong Lin, Yuanlin Township, Changhua County (TW)

(73) Assignee: CUB ELECPARTS INC., Fuxing Township, Changhua County (TW)

( * ) Notice: Subject to any disclaimer, the term of this patent is extended or adjusted under 35 U.S.C. 154(b) by 147 days.

(21) Appl. No.: 14/561,741

(22) Filed: Dec. 5, 2014

(65) Prior Publication Data
US 2016/0161319 A1   Jun. 9, 2016

(51) Int. Cl.
*G08B 21/00* (2006.01)
*G01F 23/18* (2006.01)

(52) U.S. Cl.
CPC ................... *G01F 23/18* (2013.01)

(58) Field of Classification Search
CPC ....................................... G01F 23/18
USPC ................. 340/450, 450.2, 451, 613, 614, 340/618–625
See application file for complete search history.

(56) References Cited

U.S. PATENT DOCUMENTS

2006/0130779 A1* 6/2006 Wei ................. F01P 11/029
123/41.15

* cited by examiner

*Primary Examiner* — Jeffery Hofsass
(74) *Attorney, Agent, or Firm* — Muncy, Geissler, Olds & Lowe, P.C.

(57) ABSTRACT

A tank liquid depth measurement method includes the steps of: a) providing a sensor capable of detecting a liquid pressure, b) providing a main unit for receiving data from the sensor, c) mounting the sensor under the liquid level in a water tank and mounting the main unit in the car, d) initiating the sensor and the main unit so as to cause the sensor to measure the internal liquid pressure and to enable the main unit to store the identification code and communication code of the sensor, and e) enabling the main unit to receive data from the sensor for matching and recording. By means of the operation of the sensor to transmit the detected data to the main unit for warning or informing the driver, the expected effects and objectives of the present invention are achieved.

10 Claims, 4 Drawing Sheets

TANK LIQUID DEPTH MEASUREMENT METHOD USING A PRESSURE SENSOR

BACKGROUND OF THE INVENTION

1. Field of the Invention

The present invention relates to water depth measurement techniques and more particularly, to a tank liquid depth measurement method for measuring the depth of water in a water tank of a transportation vehicle by means of sensing changes in the pressure of the water in the water tank.

2. Description of the Related Art

The basic visual inspections a car driver needs to perform before driving include five oils (power steering oil, engine oil, brake oil, gearbox oil and gasoline), four lights (headlights, turn signals, brake lights and dashboard lights), and three liquids (engine cooling water, i.e., water tank water, battery acid and wiper water). Before driving, the car driver can visually check the level of water in the water tank of the engine cooling system. However, during running of the car, the driver cannot predicate changes in the level of water in the water tank. In view of this problem, some designers created regulating valve or like means for use in the water tank of the engine cooling system of a vehicle for discharging the internal water pressure, water level or water temperature of the water tank through a discharging pipeline when the internal water pressure, water level or water temperature surpassed a predetermined alert value. Most vehicle providers have the regulating valve be installed in the tank cover of the water tank for monitoring and regulation.

For improving safety and convenience for drivers, it is quite important to instantly alert or inform the driver of changes in the physical characteristics of the liquid in the water tank. Therefore, there is a very strong demand for a tank liquid depth measurement method capable of instantly alerting or informing the driver of the measured or detected data.

SUMMARY OF THE INVENTION

The present invention has been accomplished under the circumstances in view. It is the main object of the present invention to provide a tank liquid depth measurement method practical for use in a transportation vehicle, enabling a sensor in the water tank of the transportation vehicle to provide the measured or detected liquid pressure or temperature data to a main unit in the transportation vehicle so that the main unit can instantly warn or inform the driver, thereby significantly reducing the probability of an accident due to drivers negligence, and greatly enhancing the convenience and value of practicality.

To achieve this and other objects of the present invention, a tank liquid depth measurement method in accordance with the present invention comprises the steps of a) providing a sensor capable of measuring or detecting a liquid pressure, b) providing a main unit capable of receiving data and signal provided by the sensor, c) mounting the sensor below the liquid level in a water tank of a car, and then mounting the main unit in the car, d) initiating the sensor and the main unit to cause the sensor to measure the pressure, temperature or other physical data of the liquid in the water tank and then to transmit the measured data with the original identification code and communication code of the sensor to the main unit via a transmission unit of the sensor, so that the main unit is enabled to store the original identification code and communication code of the sensor, and e) enabling a second micro control unit of the main unit to receive the data for matching, recording and warning.

In conclusion the invention is characterized by the functioning of the sensor to detect the physical characteristic (pressure or temperature) of the liquid in the water tank and to provide the detected data to the main unit. Preferably, the tank liquid depth measurement method further comprises step f) of enabling the main unit to generate a warning signal to instantly alert or inform the driver if the value of the detected data is lower than a predetermined liquid depth reference value of the water tank of the car, enabling the driver to decisively take the necessary subsequent processing steps. Thus, the invention can not only significantly reduce the probability of an accident due to drivers negligence, but also enhance the convenience and value of practicality and achieve the expected effects and objectives.

Other advantages and features of the present invention will be fully understood by reference to the following specification in conjunction with the accompanying drawings, in which like reference signs denote like components of structure.

DETAILED DESCRIPTION OF THE INVENTION

Figure 1:
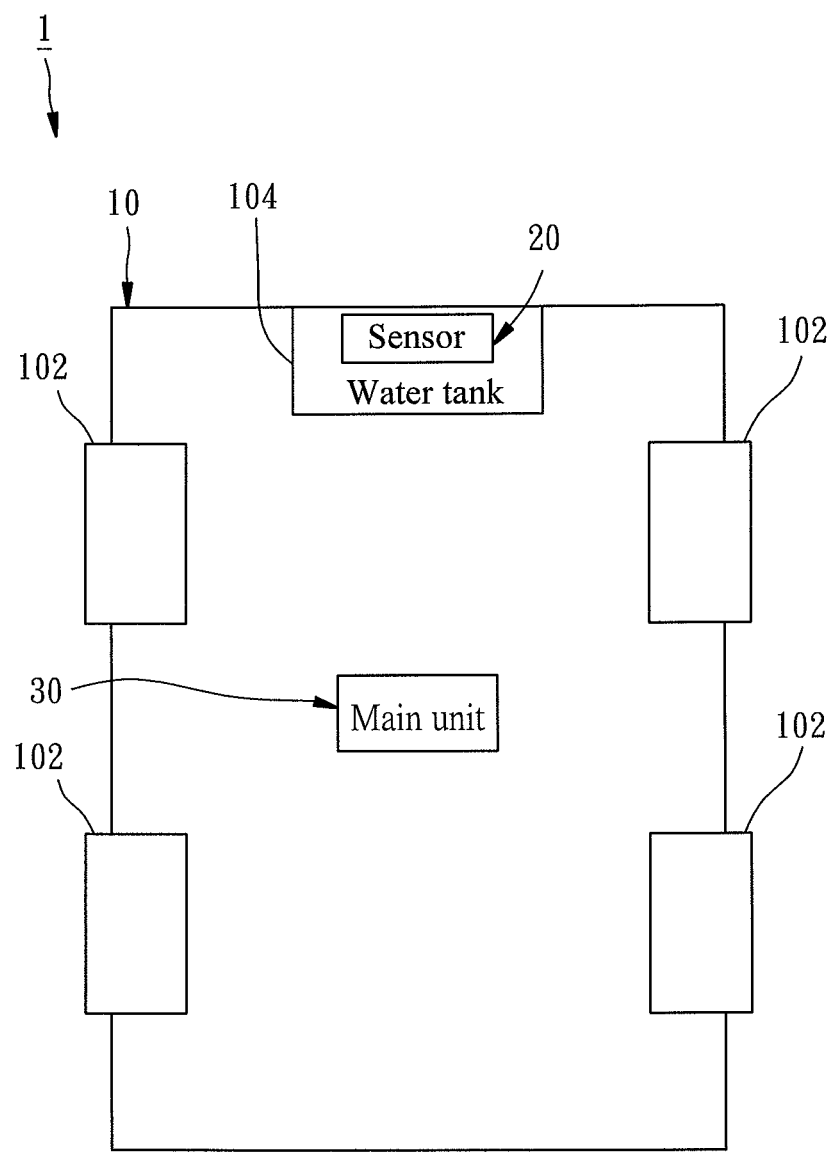
FIG. 1 is a system block diagram of a vehicle water tank liquid depth measurement system used in a tank liquid depth measurement method in accordance with the present invention.
Figure 2:
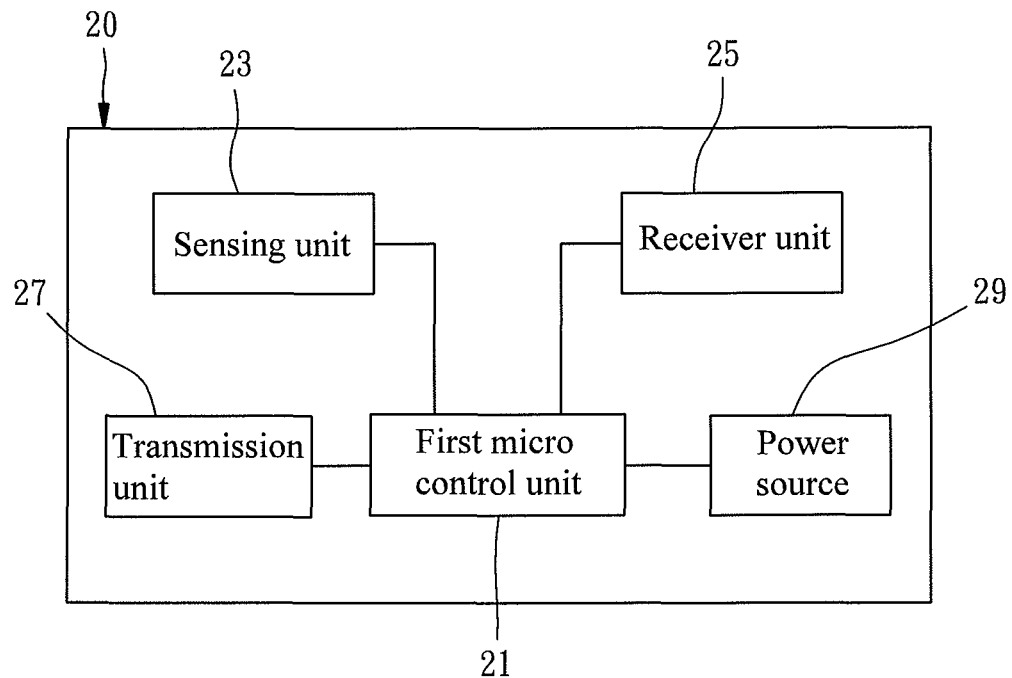
FIG. 2 is a block diagram of the first module of the vehicle water tank liquid depth measurement system used in the tank liquid depth measurement method in accordance with the present invention.
Figure 3:
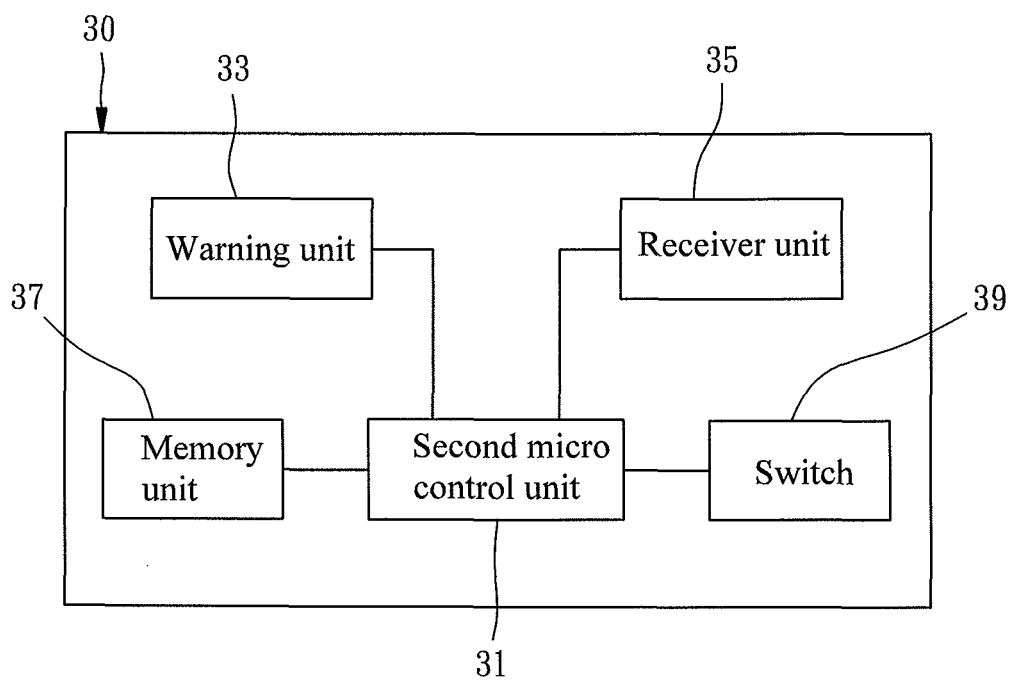
FIG. 3 is a block diagram of the second module of the vehicle water tank liquid depth measurement system used in the tank liquid depth measurement method in accordance with the present invention.

Referring to FIGS. 1-3, the invention provides a mobile vehicle water tank liquid depth measurement system 1 mountable in a car 10 comprising a plurality of tires 102 respectively equipped with a tire pressure sensor (not shown) and a water tank 104. The vehicle water tank liquid depth measurement system 1 comprises a sensor 20 and a main unit 30.

The sensor 20 is mounted in the water tank 104 of the car 10 for measuring or detecting a physical state (for example, liquid pressure or temperature) of the water in the water tank 104 of the car 10, comprising a first micro control unit 21 having electrically coupled thereto a sensing unit 23, a receiver unit 25, a transmission unit 27 and a power source 29.

The main unit 30 is mounted outside of the water tank 104 of the car 10 for receiving data and signal from the sensor 20 so as to instantly alert or notice the driver, comprising a second micro control unit 31 having electrically coupled thereto a warning unit 33, a receiver unit 35, a memory unit 37 and a switch 39.

The original identification code and communication code of the sensor 20 are combined with a communication protocol by the first micro control unit 21, and then transmitted by the transmission unit 27 to the main unit 30, and then processed through an intelligent processing by the second micro control unit 31 main unit 30, enabling the original identification code and communication code of the sensor 20 to be stored in the memory unit 37 of the main unit 30 for identification.

The receiver unit 25 of the sensor 20 is adapted for receiving a reset signal from an external third setting party (not shown) and then modifying the original identification code and communication code of the sensor 20 by means of the reset signal.

The power source 29 provides the sensor 20 with the necessary working electric energy. The switch 39 is operable to switch on/off the main unit 30.

After understanding of the structural features of the component parts of the vehicle water tank liquid depth measurement system 1, a tank liquid depth measurement method 4 using the vehicle water tank liquid depth measurement system 1 in accordance with the present invention is outlined hereinafter.

Figure 4:
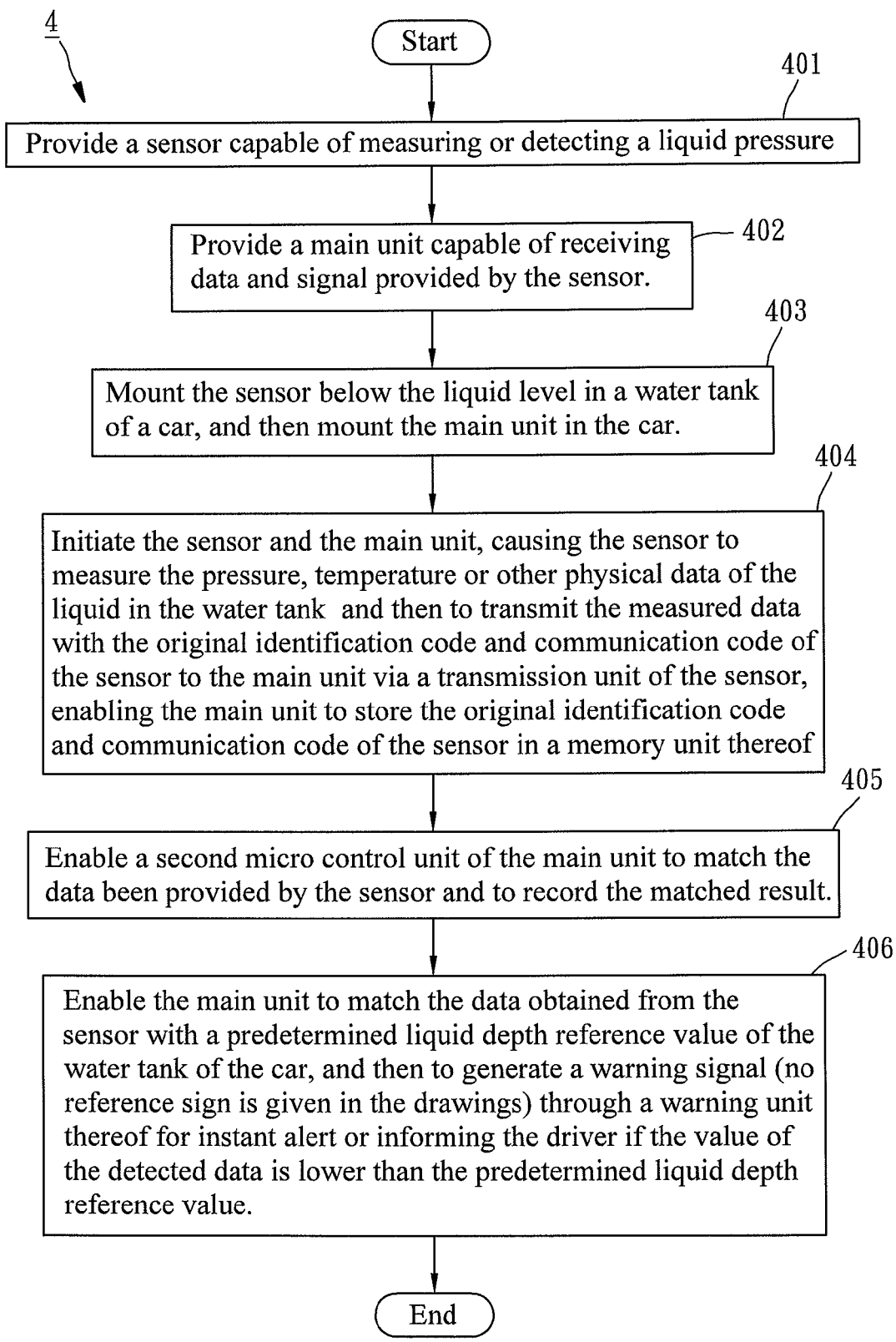
FIG. 4 is a flow chart of a first procedure (tank liquid depth measurement method) of the present invention.

Referring also to FIG. 4, the tank liquid depth measurement method 4 comprises the following steps:

a) Step 401: Provide a sensor 20 capable of measuring or detecting a liquid pressure.

b) Step 402: Provide a main unit 30 capable of receiving data and signal provided by the sensor 20 and instantly alerting or noticing a car driver.

c) Step 403: Mount the sensor 20 below the level of a liquid in a water tank 104 of a car 10, and then mount the main unit 30 in the car 10.

d) Step 404: Initiate the sensor 20 and the main unit 30, causing the sensor 20 to measure the pressure, temperature or other physical data of the liquid in the water tank 104 and then to transmit the measured data with the original identification code and communication code of the sensor 20 to the main unit 30 via the transmission unit 27 of the sensor 20, so that the main unit 30 is enabled to store the original identification code and communication code of the sensor 20 in the memory unit 37 of the main unit 30.

e) Step 405: Enable a second micro control unit 31 of the main unit 30 to match the data that was received from the sensor 20 with a predetermined liquid depth reference value of the water tank 104 of the car 10 and to record the matched result.

f) Step 406: Enable a warning unit 33 of the main unit 30 to generate a warning signal (no reference sign is given in the drawings) for instant alert or informing the driver if the value of the detected data is lower than the predetermined liquid depth reference value.

The procedure and steps of the above-described tank liquid depth measurement method 4 are characterized in that the sensing unit 23 of the sensor 20 detects the physical characteristic (for example, pressure or temperature) of the liquid in the water tank 104 of the car 10, and then transmits the detected data with an identification signal (not indicated) through the transmission unit 27 (for example: RF, IR, Zigbee, Bluetooth or Wi-Fi, etc.) to the receiver unit 35 of the main unit 30 so that the second micro control unit 31 that is electrically coupled to the receiver unit 35 of the main unit 30 can intelligently process the signal and match the value of the signal with a predetermined liquid depth reference value of the water tank 104 of the water 10 and then record the matched result, and the warning unit 33 of the main unit 30 can be controlled by the second micro control unit 31 to generate a warning signal if the value of the signal is below the predetermined liquid depth reference value, enabling the driver to decisively take the necessary subsequent processing steps. Thus, the invention can not only significantly reduce the probability of an accident due to drivers negligence, but also enhance the convenience and value of practicality and achieve the expected effects and objectives.

Figure 5:
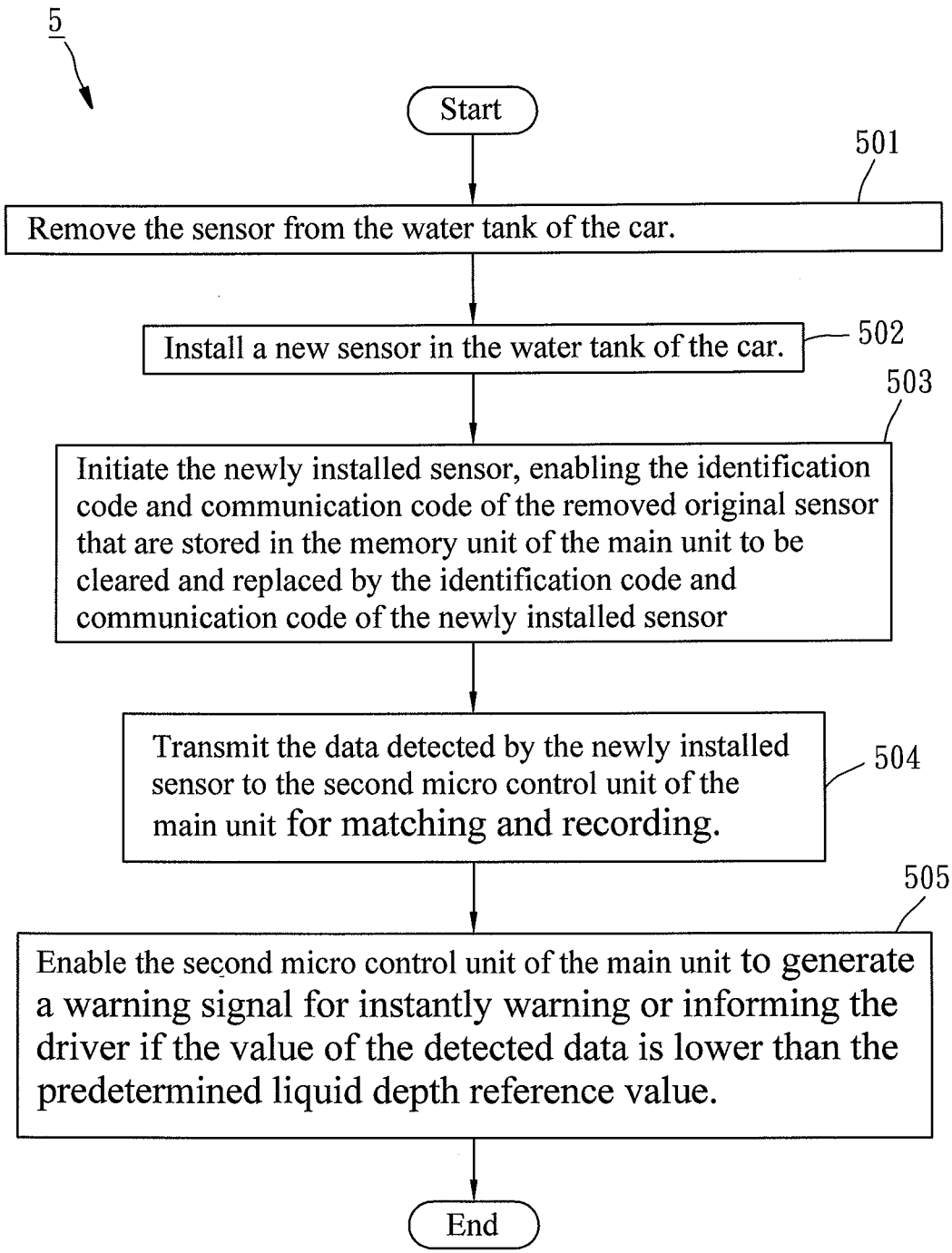
FIG. 5 is a flow chart of a second procedure (vehicle water tank liquid depth measurement system replacement and tank liquid depth measurement method) of the present invention.

After explanation of the tank liquid depth measurement method 4 and the related effects and objectives, the invention also provides a vehicle water tank liquid depth measurement system replacement and tank liquid depth measurement method 5, as illustrated in FIG. 5. This vehicle water tank liquid depth measurement system replacement and tank liquid depth measurement method 5 comprises the following steps:

a) Step 501: Remove the sensor 20 from the water tank 104 of the car 10.

b) Step 502: Install a new sensor 20 in the water tank 104 of the car 10.

c) Step 503: Initiate the newly installed sensor 20, enabling the identification code and communication code of the removed original sensor 20 that are stored in the memory unit 37 of the main unit 30 to be cleared and replaced by the identification code and communication code of the newly installed sensor 20 by means of a reset signal provided by an external third-party setting device.

d) Step 504: Transmit the data detected by the newly installed sensor 20 to the second micro control unit 31 of the main unit 30 for matching and recording.

e) Step 505: Enable the second micro control unit 31 of the main unit 30 to generate a warning signal for instantly warning or informing the driver if the value of the detected data is lower than the predetermined liquid depth reference value.

The aforesaid vehicle water tank liquid depth measurement system replacement and tank liquid depth measurement method 5 is characterized in that when the original sensor 20 and other related component parts are abnormal or damaged for some reasons, a newly sensor 20 is installed to replace the original sensor 20 and the identification code and communication code of the newly installed sensor 20 are initialized through steps 501-503 of the vehicle water tank liquid depth measurement system replacement method 5 and the reset signal of the external third-party setting device, and then step 505 and step 506 of the vehicle water tank liquid depth measurement system replacement method 5 are performed to achieve the expected effects and objectives.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tank liquid depth measurement method, comprising the steps of:
   a) providing a sensor capable of measuring or detecting a liquid pressure;
   b) providing a main unit capable of receiving data and signal provided by said sensor;
   c) mounting said sensor under a liquid in a water tank of a car and then mounting said main unit in said car;
   d) initiating said sensor and said main unit and causing said sensor to measure the pressure of the liquid in said water tank and to transmit the measured data with the identification code and communication code of said sensor to said main unit via a transmission unit of said sensor for enabling said main unit to store the identification code and communication code of said sensor;

e) enabling said main unit to receive the data been transmitted by said transmission unit of said sensor and to match the data with a predetermined reference value and to record the matched result.

2. The tank liquid depth measurement method as claimed in claim 1, wherein said sensor provided in step a) is also capable of measuring a liquid temperature.

3. The tank liquid depth measurement method as claimed in claim 2, wherein the identification code and communication code of said sensor being transmitted to said main unit in step d) is stored by said main unit in a memory unit of said main unit.

4. The tank liquid depth measurement method as claimed in claim 1, wherein in step c), said sensor is mounted in a bottom side inside said water tank.

5. The tank liquid depth measurement method as claimed in claim 4, wherein the identification code and communication code of said sensor being transmitted to said main unit in step d) is stored by said main unit in a memory unit of said main unit.

6. The tank liquid depth measurement method as claimed in claim 1, wherein the identification code and communication code of said sensor being transmitted to said main unit in step d) is stored by said main unit in a memory unit of said main unit.

7. The tank liquid depth measurement method as claimed in claim 1, further comprising step f) of enabling a warning unit of said main unit to generate a warning single for alerting or informing the driver after step e), if the value of the detected data is lower than said predetermined liquid depth reference value.

8. The tank liquid depth measurement method as claimed in claim 7, wherein the data been received from said sensor is matched with said predetermined reference value for recording and warning by a second micro control unit of said main unit.

9. The tank liquid depth measurement method as claimed in claim 7, wherein the identification code and communication code of said sensor being transmitted to said main unit in step d) is stored by said main unit in a memory unit of said main unit.

10. The tank liquid depth measurement method as claimed in claim 8, wherein the identification code and communication code of said sensor being transmitted to said main unit in step d) is stored by said main unit in a memory unit of said main unit.

* * * * *